Sept. 6, 1949.          C. E. ARMSTRONG                2,480,827
                   DETACHABLE THERMOSTAT SYSTEM
                      Filed Dec. 8, 1947
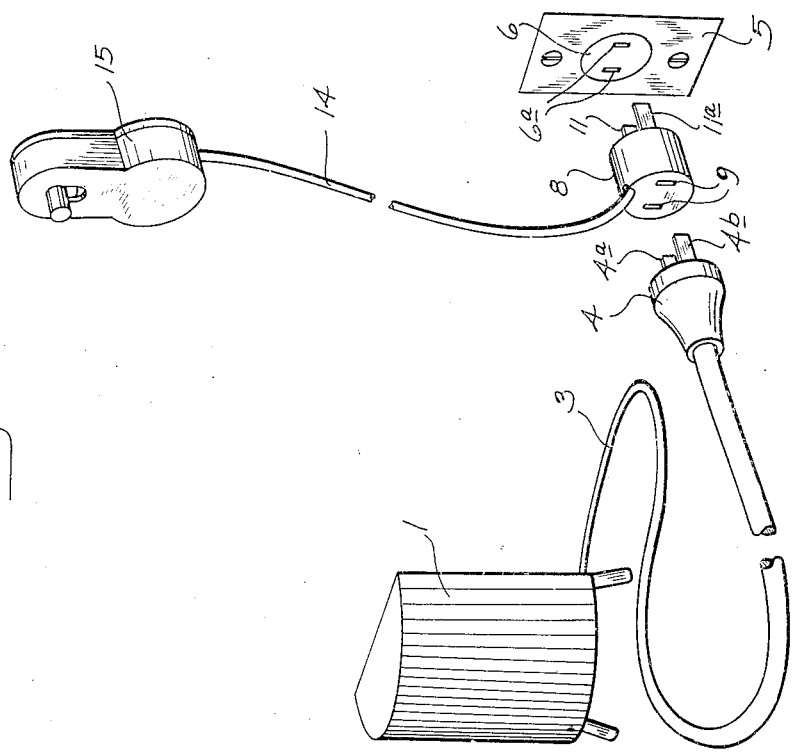
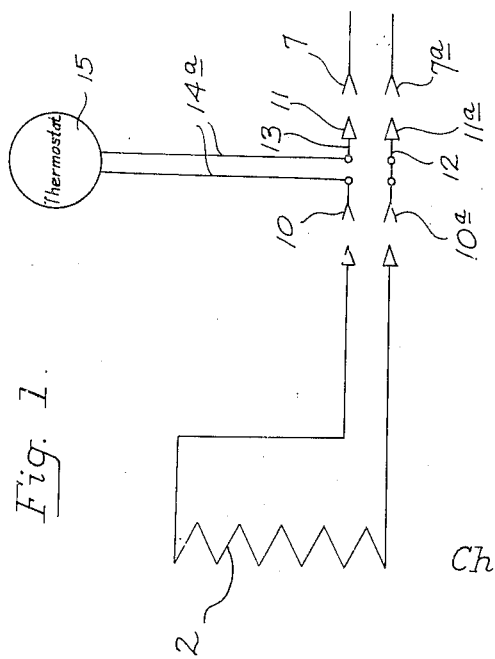
INVENTOR.
Charles E. Armstrong
BY
             Atty.

Patented Sept. 6, 1949

2,480,827

UNITED STATES PATENT OFFICE 2,480,827

DETACHABLE THERMOSTAT SYSTEM

Charles E. Armstrong, Portland, Oreg., assignor to Electric Controls, Inc., Portland, Oreg., a corporation of Oregon Application December 8, 1947, Serial No. 790,343

1 Claim. (Cl. 219—20)

My invention relates to heaters, and particularly to room heaters utilizing electrical energy. It is common practice at the present time for room heaters to be provided with heat-responsive controls, and, in case of central heating plants, it is common practice to provide thermostatic controls so that the temperature in a room can be regulated at points distant from the source of heat.

One of the principal objects of my invention is to provide an electrical heater with an insertable plug with a thermostatically controlled element joined thereto, so that said plug may be arranged in series with said heater and its source of electrical energy. Thus the supply of electrical energy may be interrupted or otherwise regulated by the thermostat when the latter is spaced substantially from the heater. For example, it is common practice to place said electric heater upon the floor of a room, and it is desirable to regulate the temperature of a room with respect to the temperatures existing therein at face height of the average person. With my invention, said plug, with the thermostat connection therein, may be inserted between the floor socket and the cord for the electric heater, and said thermostat may be provided with a long cord so that it can be located properly in a room, and it will cut off the flow of electrical energy to the heater when proper temperatures are attained as indicated by the thermostat spaced distantly from said heater.

A further and more specific object of my invention is to provide a detachable plug of this character having male terminals for insertion in the usual floor socket and female terminals for receiving the terminals of a plug for a cord. Said terminals in such detachable plug are joined in pairs by parallel electrical connections. One of said connections is broken, and arranged in series therewith is a relatively long cord having a heat-responsive make-and-break at the end thereof. Thus said plug may be used with any type device for which it is adapted and is provided with an electrical plugging connection.

Other and further details of my invention are hereinafter described with reference to the accompanying drawings, in which:

Fig. 1 is a schematic electrical diagram illustrating an electrical heating element, a floor or other receptacle for electrical heating wires, and a plug embodying my invention, showing a thermostatic switch arranged in series with the latter; and Fig. 2 is a view showing said parts in their physical relation to each other, the cords of the electrical heating device and to the thermostatic switch being shown foreshortened.

My invention is adapted to be used with any type of electrical heating device and is shown illustrated in connection with a standard electrical floor heater 1. Said floor heaters usually are provided with resistance wires 2 and frequently are joined by a relatively long cord 3 to a removable plug 4 having plural terminals 4a and 4b, which are usually prong or male-type terminals.

It is common practice to provide an electrical outlet 5 in the baseboard or other part of a room, and said outlets have a central portion 6 made of electrically insulating material and are provided with apertures 6a, through which access may be had to plug-in terminals 7—7a.

My invention comprises a plug 8, preferably having a body of cylindrical form. On one end face thereof are apertures 9 to provide access to similar plug-in terminals 10—10a within the plug. At the opposite end are pairs of prong or male terminals 11—11a extending laterally from the face thereof. As is shown in the diagram in Fig. 1, terminals 10a—11a are joined by an electrical connection 12. The electrical connection 13 which joins terminals 10 and 11 is broken, and arranged in series with said terminals 10 and 11 are the electrical conducting wires 14a in the cord 14 leading to a heat-responsive electrical make-and-break thermostat 15.

The details of said thermostat are not illustrated because they are generally known to persons skilled in the art, and any of many different types of thermostats are usable with my invention.

The cord 14 may be of any length, but preferably is of sufficient length so that the thermostat may be supported at face height on the walls of a room to be heated. The cord for the heater likewise should be of sufficient length so that the heater may be arranged conveniently to heat said room. It is common to provide adjustable cut-off temperatures for thermostats, and thus the thermostat can be set to cut off the supply of electrical energy a any predetermined temperature in the usual fashion.

Said plug with the thermostat connected thereto may be inserted in any electrical receptacle by pushing the prongs or male terminals 11—11a into the apertures 6a so that they are in electrical connection with the terminals 7—7a in said floor plug. Likewise, the plug 4 on the end of the cord 3 carrying male terminals 4a—4b may be arranged in electrical connection with the female terminals 10—10a in said plug. When this is done, electrical energy flows through the connections 12 and 13 within the plug and through the conducting wires 14a to the thermostat 15. As long as the make-and-break in said thermostat is closed, it will make electrical connection to the floor heater 1. When a predetermined temperature is attained, it will be opened in the usual manner to break said electrical circuit and to de-energize heating elements 2 in said floor heater.

I claim:

The combination with an electrical radiant space heating device and its supply of electrical energy, said heating device having an electrical connection with a detachable plug-in terminal, of a separable plug arranged intermediate said detachable plug-in terminal and the electrical supply and in series therewith, said separable plug comprising two spaced pairs of terminals for joining electrically said supply and the detachable plug-in terminal of said heating element, electrical connections in said plug for joining said pairs of terminals in parallel, and a distant heat-responsive electrical make-and-break joined in series by a flexible cord carrying wires of substantial length with one of the electrical connections joining a connected pair of spaced terminals in said separable plug, whereby the effective heat, at a selected distant point, given off from said heater may be controlled by making and breaking the electrical supply to said heater.

CHARLES E. ARMSTRONG.

REFERENCES CITED

The following references are of record in the file of this patent:

UNITED STATES PATENTS

| Number | Name | Date |
|---|---|---|
| 1,788,515 | Gannon | Jan. 13, 1931 |
| 1,903,015 | Steerup | Mar. 28, 1933 |
| 1,980,509 | Tuck | Nov. 13, 1934 |
| 2,080,797 | Wiegand | May 18, 1937 |
| 2,098,771 | Bogue | Nov. 9, 1937 |
| 2,174,028 | Blakesley | Sept. 26, 1939 |
| 2,222,880 | Ritz-Waller | Nov. 26, 1940 |
| 2,430,194 | Snyder | Nov. 4, 1947 |